United States Patent Office 3,413,349
Patented Nov. 26, 1968

3,413,349
PROCESS FOR PREPARING PHENYLHYDROXYL-
AMINE AND CUPFERRON
Hugh C. Bertsch, St. Louis, and Charles R. Conard, Ferguson, Mo., assignors to Mallinckrodt Chemical Works, St. Louis, Mo., a corporation of Missouri
No Drawing. Filed May 21, 1965, Ser. No. 457,843
12 Claims. (Cl. 260—580)

ABSTRACT OF THE DISCLOSURE

Cupferron is prepared by zinc reduction of nitrobenzene followed by nitrosation of the resulting phenylhydroxylamine with an alkyl nitrite in the presence of ammonia. The preferred reaction medium comprises a mixture of (1) a lower alkanol or dioxane and (2) water. The nitrobenzene and phenylhydroxylamine are both soluble in the medium while cupferron is insoluble. As the same medium serves for both reactions, isolation of the intermediate phenylhydroxylamine is unnecessary.

---

This invention relates to synthetic organic chemical processes and more particularly to improved processes for preparing phenylhydroxylamine and cupferron (N-nitroso-phenylhydroxylamine, ammonium salt).

Briefly, the present invention is directed to an improvement in the classical process of preparing cupferron by the zinc reduction of nitrobenzene and nitrosation of the resulting phenylhydroxylamine in the presence of ammonia which improvement comprises carrying out both reactions in an aqueous/organic reaction medium whose properties are such as to avoid many of the problems associated with the classical process. The invention also includes an improved process of preparing phenylhydroxylamine.

Among the objects of the invention may be mentioned the provision of improved processes for the preparation of cupferron by the zinc reduction of nitrobenzene and the nitrosation of the phenylhydroxylamine thus formed; the provision of processes of the type described which avoid the necessity for isolating the intermediate phenylhydroxylamine; the provision of processes of the type described which permit carrying out all the chemical reaction steps in a single reaction medium; the provision of such processes which are less costly and less hazardous than the classical method; and the provision of improved processes of preparing phenylhydroxylamine. Other objects and features will be in part apparent and in part pointed out hereinafter.

The invention accordingly comprises the methods hereinafter described, the scope of the invention being indicated in the following claims.

The present invention is directed to an improvement in the process of preparing cupferron by the zinc reduction of nitrobenzene and nitrosation of the resulting phenylhydroxylamine in the presence of ammonia which comprises carrying out the reactions in a multi-component reaction medium having a relatively high solvent capacity for nitrobenzene and phenylhydroxylamine and a relatively low solvent capacity for cupferron and containing at least the stoichiometric quantity of water required by the nitrobenzene reduction. The invention also includes an improved process of preparing phenylhydroxylamine.

The ammonium salt of N-nitroso-phenylhydroxylamine, more commonly known as cupferron, has been known for many years. Its use as an analytical reagent goes back at least to 1909, when O. Baudisch (Chem. Ztg., 33, 1298) reported its use for the separation of copper from iron. More recently, it has been found useful as a stabilizer for acrylonitrile and other unsaturated monomers (see, for example, U.S. Patent 2,758,131 and German Patent 1,180,733).

Phenylhydroxylamine is an intermediate in the preparation of cupferron and of other commercially important products. For example, in acid solutions phenylhydroxylamine rearranges to p-aminophenol, an intermediate in the preparation of dyestuffs and a p-acetamidophenol, an important ingredient of analgesic preparations.

The best prior art procedure for the preparation of phenylhydroxylamine and cupferron is that outlined in Organic Syntheses, vol. VI (1925), pages 19–21, 57–8. This procedure utilizes reactions which may be represented by the following equations.

(1)
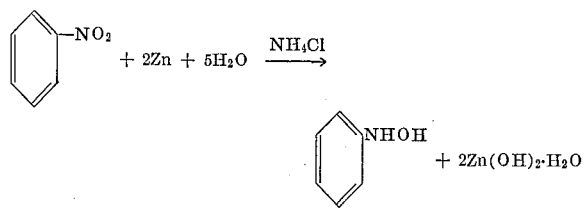

(2)
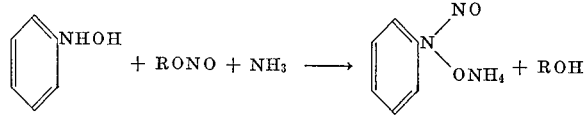

where R is alkyl.

The intermediate, phenylhydroxylamine, is first prepared by reducing nitrobenzene by means of zinc dust in aqueous medium. Since water is an unsuitable reaction medium for the next step, the phenylhydroxylamine is precipitated after the by-product zinc hydroxide has been filtered off. Phenylhydroxylamine is quite soluble in water but may be salted out by saturating the aqueous solution with sodium chloride and cooling the mixture to about 0° C. Since moist phenylhydroxylamine deteriorates on storage, it must be used promptly in the second step.

In the next step of the classical method, the moist intermediate phenylhydroxylamine is dissolved in diethyl ether, the ether insoluble material (sodium chloride and water) is separated and the phenylhydroxylamine is nitrosated by the slow addition of n-butyl nitrite in the presence of excess ammonia. The resulting cupferron precipitates as it forms and is filtered off and dried.

The improved process of the present invention utilizes the chemical reactions represented by Equations 1 and 2 above but permits both the reduction and nitrosation reactions to be carried out in the same reaction medium without isolating the intermediate phenylhydroxylamine. Moreover, the hazards which attend the handling of ethyl ether are eliminated. The resulting reductions in the labor and capital requirements for plant scale operations lead to a substantial reduction in the cost of producing cupferron.

In accordance with the present invention, cupferron is prepared by the chemical reactions represented by Equations 1 and 2 above but the reactions are carried out in a multicomponent, predominantly organic solvent whose properties permit the use of the same solvent as a reaction medium for both chemical reactions. Suitable reaction media comprise, for example, a minor proportion of water and a major proportion of dioxane or a lower aliphatic alcohol.

The use of such solvent systems has several advantages over the classical systems. In the first place, the necessity for precipitating phenylhydroxylamine from the initial reaction mixture is eliminated. Moreover, the initial reaction system is simplified, since the starting material, nitrobenzene, is soluble in the present reaction medium, whereas it is insoluble in the aqueous medium used in the classical process.

Pertinent properties of certain organic solvents which have been found suitable for use as the organic components of the reaction media in the processes of the present invention are set forth in Table 1. The significance of the data tabulated will be brought out hereinafter.

content of recovered distillates may vary somewhat from the true azeotropic values shown in Table 1. For example, in the recovery of isopropyl alcohol as described, the water content of the distillate may often run about 15–16%, rather than the azeotropic value of 12%.

From the point of view of the water content of the azeotrope, it will be seen by reference to Table 1 that di-

TABLE 1.—PROPERTIES OF ORGANIC COMPONENTS OF REACTION MEDIA

| Organic solvent component of reaction medium | Suitability as reaction medium | | B.P. of nitrite ester (° C.) | B.P. of solvent (° C.) | Properties of azeotrope | | Solubility of cupferron in solvent |
|---|---|---|---|---|---|---|---|
| | Reduction | Nitrosation | | | B.P. (° C.) | Percent H₂O | |
| Methyl alcohol | Good | V. Good | −17 | 64 | (¹) | | Moderate. |
| Ethyl alcohol | V. Good | do | +17 | 78.5 | 78 | 4.4 | Slight. |
| n-Propyl alcohol | Good | do | 57 | 97 | 88 | 28 | Low. |
| i-Propyl alcohol | V. Good | do | 45 | 82 | 80 | 12 | Low. |
| n-Butyl alcohol | Good | do | 75+ | 118 | 93 | 44 | V. Low. |
| i-Butyl alcohol | do | do | 68 | 108 | 90 | 30 | V. Low. |
| Sec-butyl alcohol | do | do | 68 | 99.5 | 87.5 | 27 | V. Low. |
| t-Butyl alcohol | V. Good | do | 63 | 82.5 | 80 | 12 | V. Low. |
| Amyl alcohol | Good | do | 104 | 138 | 96 | 54 | V. Low. |
| t-Amyl alcohol | do | do | 92 | 102 | 87 | 27 | V. Low. |
| Dioxane | do | do | | 101 | 88 | 18 | Low. |

¹ No azeotrope.

It will be noted from Equation 1 that water is a reactant in the reduction of nitrobenzene. Therefore, at least the quantity of water stoichiometrically required by Equation 1 must be present initially in the reaction medium. This may influence the selection of a particular solvent system, as discussed below.

The mother liquors remaining after the recovery of cupferron may contain a variety of dissolved materials, including unreacted phenylhydroxylamine and/or alkyl nitrite, products of side reactions and secondary reactions from the reduction and nitrosation steps, and unrecovered cupferron.

When the solvent is to be recovered by distillation it is advisable to add an excess of caustic to the mother liquors prior to distillation. The addition is preferably made as a dilute aqueous solution of sodium hydroxide or other alkali. The caustic hydrolyzes any unreacted alkyl nitrite, thus eliminating a potential source of contamination of the distillate. Moreover, the acid forms of some of the dissolved components of the mother liquors may be thermally unstable, thereby constituting a potential safety hazard. This hazard is minimized by the prior addition of a caustic solution.

The distillate is normally recovered, at least in part, as an aqueous organic azeotrope. The first portion of the distillate contains ammonia and other volatile nitrogen compounds, such as azobenzene, which may be separated from the main portion by the use of an efficient fractionating column or by a second distillation from acid solution. Other unwanted by-products, etc., will remain in the aqueous alkaline still residue.

The recovery of the organic solvent as an aqueous azeotrope is not objectionable, particularly if the solvent is to be recycled, because of the requirement for water as a reactant in the nitrobenzene reduction. However, variations in the water content of the azeotropes of suitable organic components of the reaction medium may be a significant factor in the selection of the particular solvent system to be employed. Organic solvents whose aqueous azeotropes contain not more than approximately 30% water are generally preferred. If the water content of the azeotrope is insufficient to meet the stoichiometric requirement of the nitrobenzene reduction, it is of course a simple matter to add sufficient water to provide the desired amount. On the other hand, the nitrobenzene reduction tends to proceed too rapidly when the water content of the reaction medium is much greater than 30%. Moreover, solubility losses of cupferron in the final mother liquors become excessive at about the same water content. The optimum concentration of water in the reaction medium for the nitrobenzene reduction is about 20% (about 1.5 times the stoichiometric quantity).

It will be obvious that in operating practice the water oxane and ethyl, n- and i-propyl, i-, sec- and t-butyl, and t-amyl alcohols are preferred.

The nitrobenzene reduction is preferably carried out at temperatures in the range of approximately 70° C. to approximately 85° C. The selection of reaction media boiling in this range is particularly advantageous because boiling of the reaction mixture under reflux helps to carry off any excess heat liberated in the exothermic reaction which may exceed the cooling capacity of coolants applied externally to the reaction vessel. From this point of view, aqueous alcoholic media containing up to about 25% water, in which the alcoholic component is ethyl, i-propyl or t-butyl alcohol, are preferred.

The nitrobenzene reduction is preferably carried out in a substantially neutral reaction medium. This is of particular importance when the reaction medium is wholly or largely composed of recycled alcoholic distillate recovered from previous runs. If alkaline compounds such as ammonia contaminate the recovered distillate it may be necessary, in order to achieve maximum yields, to adjust the pH of the recovered distillate when it is used as the reaction medium in a subsequent run. For example, it has been found that, using an aqueous isopropyl alcohol reaction medium and otherwise optimum conditions, cupferron yields of about 70% or more are achieved when the pH of the reaction medium for the nitrobenzene reduction is not substantially less than 6.5 nor substantially greater than 8.0. On the other hand, yields of cupferron drop to about 65% when the nitrobenzene reduction medium is as acid as pH 5.6 or as alkaline as pH 8.5. The use of more acid or alkaline media results in a further decrease in yields. (The foregoing data are based on the apparent pH of the aqueous-alcoholic solutions determined with a commercial glass electrode pH meter.)

Other factors being equal, there is an advantage in selecting reaction media in which the organic component is an alcohol and the nitrosating agent is the nitrite ester of the same alcohol. It will be seen from Equation 1 above that in the nitrosation reaction consumption of the alkyl nitrite (RONO) regenerates an equivalent quantity of the corresponding alcohol (ROH). Under such conditions, recovery of the solvent by azeotropic distillation is not complicated by the presence of two or more organic components.

As the nitrosating agent any lower alkyl nitrite may be used. However, such nitrites having boiling points higher than normal room temperatures (25° C.) are preferred. The more volatile nitrites (methyl and ethyl) are more difficult to handle safely and they offer no particular compensating advantages.

As in the classical method, ammonium chloride is included in the nitrobenzene reduction system to achieve an acceptably high reaction rate. Any soluble quantity may be used, but a quantity equal to about 1–3% of the total weight of the reaction mixture is preferred.

The following examples further illustrate the invention. In the examples, where amyl nitrite is specified as the nitrosating agent the product used was a commercial grade of amyl nitrite prepared by the esterification of a high grade of fusel oil. This is predominantly isoamyl alcohol, with variable proportions of other amyl alcohols and possibly a small proportion of one or more butyl alcohols.

EXAMPLE 1

Zinc dust (223 g.) was added to a rapidly stirred solution of ammonium chloride (30 g.) and nitrobenzene (180 g.) in isopropyl alcohol (1000 ml.) and water (200 ml.). Upon the addition of zinc dust, the temperature rose and when the temperature reached 70° C., the reaction vessel was cooled to control the rate of reaction. The reaction mixture was allowed to boil under reflux with stirring for about 45 minutes following addition of the zinc dust. The reaction mixture was allowed to cool slightly (70° C.) and was then filtered to separate the precipitate of zinc hydroxide from the solution of phenylhydroxylamine. The filter cake was washed with small portions of isopropyl alcohol.

The combined filtrate and washings were cooled in a bath to a temperature of 0–4° C. and gaseous ammonia (750 cc. per minute) was bubbled through the solution while isopropyl nitrite (114 g.) was slowly added during a period of 25–30 minutes. The flow of ammonia was continued for a total of 50 minutes, after which the precipitated cupferron was filtered off, washed with cold isopropyl alcohol and dried. The yield of cupferron was 70% of theory.

EXAMPLE 2

The preparation described in Example 1 was repeated, using amyl nitrite as the nitrosating agent. There was no significant difference in the yield of cupferron.

EXAMPLE 3

The preparation described in Example 1 was repeated, using recovered isopropyl alcohol as the organic component of the reaction medium. The recovered alcohol was obtained by adding 10% sodium hydroxide solution to the mother liquors from the preparation of cupferron in Example 1 and distilling the alkaline aqueous alcoholic solution. (A good fractionating column was used in the distillation, and the first fraction, containing volatile nitrogen compounds, was discarded.) Sufficient water was added to the recovered alcohol to produce a water/alcohol ratio of 2:10 (v./v.) and the apparent pH of the aqueous alcoholic solution of ammonium chloride was adjusted to about 7.5 prior to the addition of the nitrobenzene. There was no significant difference in the yield of cupferron from that obtained in Example 1.

EXAMPLES 4–10

The preparation described in Example 1 was repeated with a variety of reaction media and nitrosating agents. The indicated variables and the resulting yields of cupferron are set forth in Table 2.

TABLE 2

| Example No. | Organic component of reaction medium | Nitrosating agent | Yield of cupferron, percent |
| --- | --- | --- | --- |
| 4 | Methanol | Ethyl nitrite | 48 |
| 5 | do | Amyl mitrite | 48 |
| 6 | Ethanol | Ethyl nitrite | 65 |
| 7 | n-Propyl alcohol | Amyl nitrite | 64 |
| 8 | n-Butyl acloholl | do | 30 |
| 9 | t-Butyl alcohol* | t-Butyl nitrite | 78 |
| 10 | Dioxane | Amyl nitrite | 61 |

*Isopropyl alcohol used as wash liquid because t-butyl alcohol (F.P. 24° C.) is solid below room temperatures.

From the facts set forth above, it will be seen that the process of the present invention represents a distinct improvement over the classical process.

The embodiment utilizing isopropyl alcohol as the organic component of the reaction medium and isopropyl nitrite as the nitrosating agent is particularly desirable. The solvent capacity for nitrobenzene, phenylhydroxylamine and cupferron of isopropyl alcohol media containing less than about 30% water is well suited to the needs of the process. Isopropyl nitrite boils at a sufficiently high temperature to permit safe handling, it is an effective nitrosating agent and it generates the same solvent component, isopropyl alcohol, as a by-product of the nitrosation reaction. The water content of the aqueous azeotrope of isopropyl alcohol is in the range preferred for reuse, and the boiling point of the alcohol and its azeotrope are within the preferred range for conduct of the nitrobenzene reduction under reflux. The alcohol is also readily available and relatively inexpensive. Cupferron yields using this system are high.

The embodiment of the invention using t-butyl alcohol and the corresponding nitrite shares most of the advantages of the isopropyl alcohol system. The high melting point of t-butyl alcohol is a slight disadvantage, but the high yields of cupferron obtainable with this system represent a compensating advantage.

In general, the corresponding systems using the other 2–5 carbon alcohols or dioxane possess many of the advantages of the isopropyl alcohol and t-butyl alcohol systems but suffer from one or more minor disadvantages as will be seen from a study of Tables 1 and 2.

The methanol system, while providing distinct advantages over the classical solvent systems, has fewer advantages than other embodiments of the present invention.

In view of the above, it will be seen that the several objects of the invention are achieved and other advantageous results attained.

As many changes could be made in the above methods without departing from the scope of the invention, it is intended that all matter contained in the above description shall be interpreted as illustrative and not in a limiting sense.

What is claimed is:

1. In the process of preparing cupferron by the zinc reduction of nitrobenzene and nitrosation of the resulting phenylhydroxyl-amine in the presence of ammonia, the improvement which comprises carrying out the reactions in a reaction medium containing at least the stoichiometric quantity of water required by the reduction of nitrobenzene and an organic solvent selected from the group consisting of dioxane and lower alkanols.

2. A process according to claim 1 in which one component of said reaction medium is an alkanol containing not more than five carbon atoms.

3. A process according to claim 1 in which said reaction medium consists of two components, one being water and the other being an alkanol containing not less than two and not more than five carbon atoms.

4. A process according to claim 1 in which the reaction medium is substantially neutral.

5. A process according to claim 3 in which the nitrosating agent for effecting nitrosation of phenyl-hydroxyl-amine is the nitrite ester of the alcoholic component of the reaction medium.

6. A process according to claim 3 in which the alkanol is isopropanol.

7. A process according to claim 5 in which the alcoholic component of the reaction medium is isopropanol.

8. A process according to claim 2 in which the alkanol is t-butanol.

9. A process for preparing cupferron which comprises the steps of (1) reducing nitrobenzene to phenylhydroxyl-amine by means of zinc dust in a reaction medium containing at least the stoichiometric quantity of water required by the reaction and an organic solvent selected from the group consisting of dioxane and lower alkanols;

(2) separating the by-product zinc hydroxide;
(3) treating the resulting solution of phenyl-hydroxylamine with a nitrosating agent in the presence of excess ammonia; and
(4) separating the resulting cupferron.

10. A process for preparing cupferron which comprises the steps of
(1) reducing nitrobenzene to phenylhydroxylamine by means of zinc dust in an aqueous isopropanol reaction medium containing water in an amount not substatially less than the stoichiometric quantity required by the reaction and not substantially more than 30% of the total volume of the medium;
(2) separating the by-product zinc hydroxide;
(3) treating the resulting solution of phenyl-hydroxylamine with an excess of isopropyl nitrite in the presence of excess ammonia; and
(4) separating the resulting cupferron.

11. A process according to claim 10 wherein the mother liquors resulting from the separation of cupferron are treated with a solution of caustic, the resulting mixture is distilled, and the resulting aqueous alcoholic distillate is recovered and reused as the reaction medium in a succeeding prepartion of cupferron.

12. A process for preparing phenylhydroxylamine which comprises adding zinc dust to a solution of nitrobenzene in a substantially neutral reaction medium containing at least the stoichiometric quantity of water required by the reaction, an organic solvent selected from the group consisting of dioxane and lower alkanols, and ammonium chloride in a proportion not substantially less than 1% of the total weight of the reaction mixture.

References Cited

Gilman, Editor, Organic Synthesis, 2d ed., 1951, coll. vol. I, pp. 177 and 445.

CHARLES B. PARKER, *Primary Examiner.*

P. C. IVES, *Assistant Examiner.*